United States Patent [19]

Otsuki et al.

[11] Patent Number: 4,562,756
[45] Date of Patent: Jan. 7, 1986

[54] NUMERICAL CONTROL SCREW TIGHTENING MACHINE

[75] Inventors: Toshinori Otsuki, Yawata; Teruo Maruyama, Hirakata, both of Japan

[73] Assignee: Matsushita Electric Industrial Co., Ltd., Kadoma, Japan

[21] Appl. No.: 631,538

[22] Filed: Jul. 16, 1984

[30] Foreign Application Priority Data

Jul. 19, 1983 [JP] Japan ................................. 58-132418
Jul. 27, 1983 [JP] Japan ................................. 58-138414

[51] Int. Cl.[4] ............................................. B25B 29/00
[52] U.S. Cl. .................................................. 81/57.4
[58] Field of Search ..................... 81/57.4, 57.24, 57.35

[56] References Cited

U.S. PATENT DOCUMENTS 3,088,349 5/1963 Cowan et al. ........................ 81/57.4
4,483,219 11/1984 Sticht et al. ......................... 81/57.4

FOREIGN PATENT DOCUMENTS 57-102727 6/1982 Japan .................................... 81/57.4

Primary Examiner—James L. Jones, Jr.
Attorney, Agent, or Firm—Cushman, Darby & Cushman

[57] ABSTRACT

By utilizing a movable table (19), an electrical driver (21) attached to the table (19), a hole position detecting means (26) for detecting a hole position of the work roughly disposed beforehand, with using an ultrasonic element (53), the hole position can be detected precisely and a screw tightening can be executed exactly and automatically even when the hole position is so discrepant within predetermined area.

8 Claims, 17 Drawing Figures

NUMERICAL CONTROL SCREW TIGHTENING MACHINE

BACKGROUND OF THE INVENTION

1. Field of the Invention

The present invention relates generally to a numerical control screw tightening machine, and particularly concerns the numerical control screw tightening machine capable of automatically detecting screw holes of a work by utilizing an ultrasonic wave and can automatically control the position of an electric driver, thereby enabling automatic and precise tightening of a screw.

2. Description of the Prior Art

Figure 1:
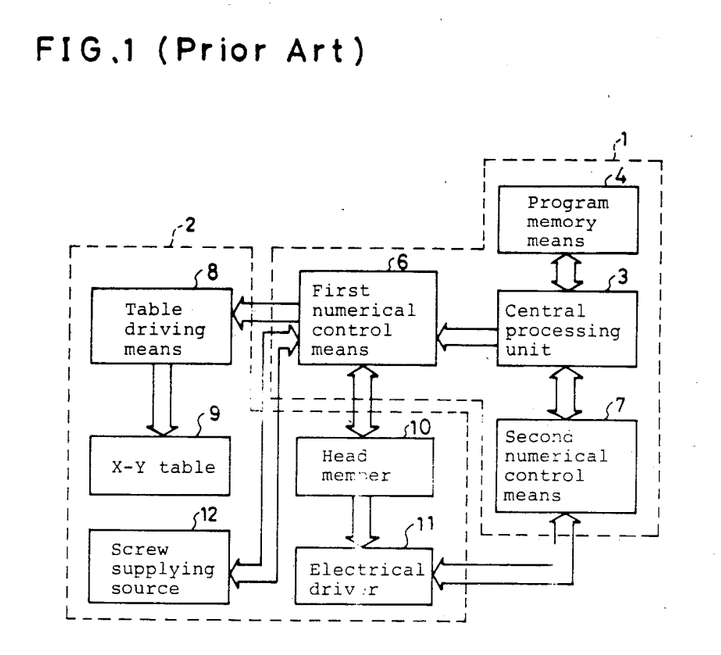
FIG. 1 is the block diagram showing the conventional numerical control screw tightening machine.

As shown in FIG. 1, a conventional numerical control screw tightening machine comprises a numerical control apparatus 1 and a screw tightening apparatus 2. The numeric control apparatus 1 comprises a central processing unit 3, a program memory means 4, a first numerical control means 6 for driving a movable table 9, etc. and the second numerical control means 7 for driving an electrical screw driver 11 and stopping the electrical screw driver 11, etc. after a stopping of the table movement. The screw tightening apparatus 2 comprises a table driving means 8, X-Y table 9, a head member 10, an electrical screw driver 11 and a screw supplying source 12. The conventional numerical control screw tightening machine tightens screws into screw holes of an object work, which are disposed at a predetermined position on a conveyer line and have a predetermined relative positional relation against the screw tightening apparatus 2, according to a predetermined screw tightening data. In the above-mentioned conventional machine, the object work should be disposed precisely at the predetermined position of the conveyer line for preventing a defective screw tightening. Therefore, a roller conveyer can not be used but a module type conveyer which can precisely dispose the holes should be used. But the machine using the module type conveyer has a disadvantage that it is expensive. Further, when various kinds of works are served for screw tightening, exclusive palettes designed for each kind of work are usually made and the work is disposed in the palette and the palette is supplied by the module type conveyer. Therefore, in this case, there is also a disadvantage that the cost of making the palettes is expensive. Furthermore, concerning with a big scale work, on which the processing errors of the screw hole position and pitch are liable to be of an order of about 2 mm, even though the work is fixed precisely on the palette, the relative positional relation between the hole of the work and the screw tightening apparatus 2 is liable to get out of order largely. Therefore, the screw tightening according to the predetermined screw tightening data can not be executed precisely and automatic producting system including screw tightening process have not been realized.

For dissolving the above-mentioned disadvantages, hitherto another screw tightening machine using an ITV (industrial television) has been offered. The machine is such that an image of the work including a hole image is optically produced by an ITV camera, and a central position of the hole is detected by processing the image. However, the machine function is liable to be effected by a color or contrast of the work or a brightness of a circumference of a working place, and the machine is expensive. Therefore, the machine is not adequate against a screw tightening machine.

SUMMARY OF THE INVENTION

The present invention is intended to offer a numerical control screw tightening machine that can dissolve the above-mentioned disadvantages at the screw tightening against the hole of the work, the position of which is gotten out of order within predetermined extent, by obtaining such precise detection of the central position of the hole that the conventional ITV type machine could not achieve. The present invention is based on the following inventive concept. Though hitherto an ultrasonic element has been used originally for detecting one-dimensional quantity, when detection of two-dimensional quantity (the position or shape of the work) is intended, very wide sensing has been usually necessary and a much time for detecting has been taken, but the present invention is based on such principle that the two-dimensional quantity can be detected precisely and quickly by combining the ultrasonic element and the numerical control screw tightening machine. The numerical control screw tightening machine of the present invention can detect highly precise hole position, which can not absolutely be obtained by the conventional numerical control screw tightening machine.

The numerical control screw tightening machine in accordance with the present invention comprises a screw tightening apparatus having a movable table and an electrical driver attached to the table, the hole position detecting means for detecting the hole position of the work by utilizing an ultrasonic element attached to the screw tightening apparatus, a numerical control apparatus for controlling the table, the electrical driver and hole position detecting means, the numerical control apparatus supplied with an information with regard to the hole position from the hole position detecting means, and a transfer means for transferring the work and disposing beforehand the hole of the work roughly.

DETAILED DESCRIPTION OF A PREFERRED EMBODIMENT

The first embodiment of the present invention is described as follows referring to the FIGS. 2 and thereafter.

Figure 2:
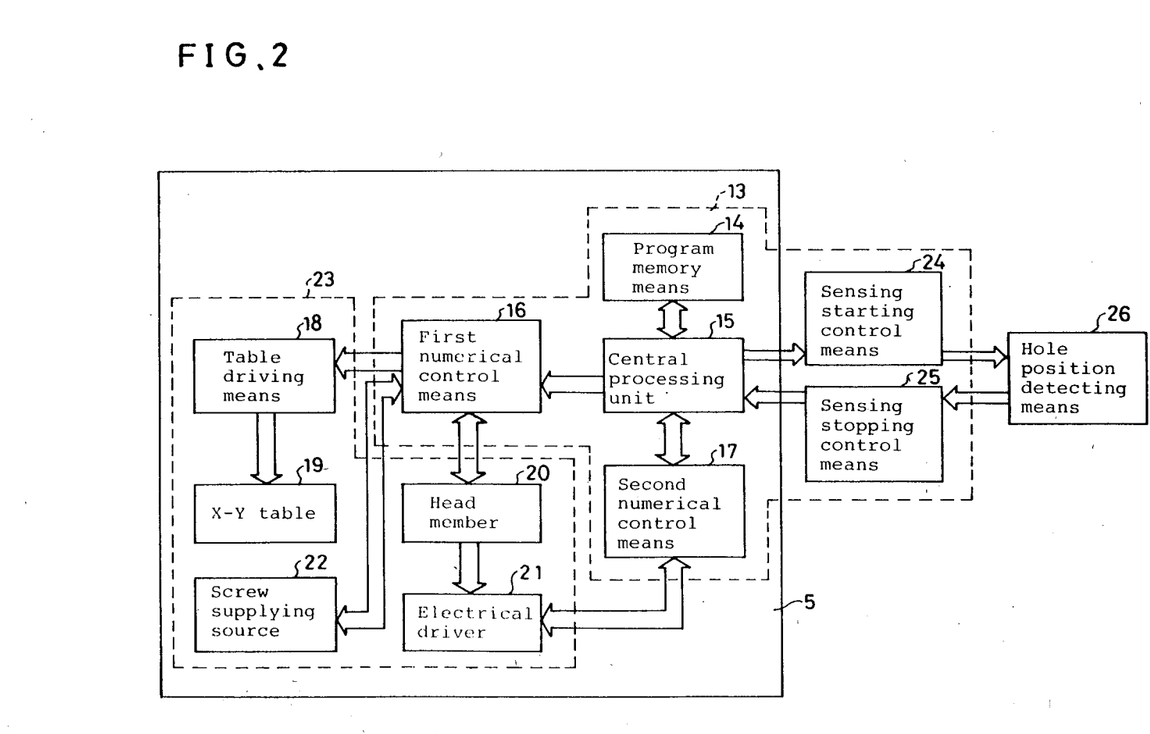
FIG. 2 is a block diagram showing a first embodiment of a numerical control screw tightening machine of the present invention.
Figure 3:
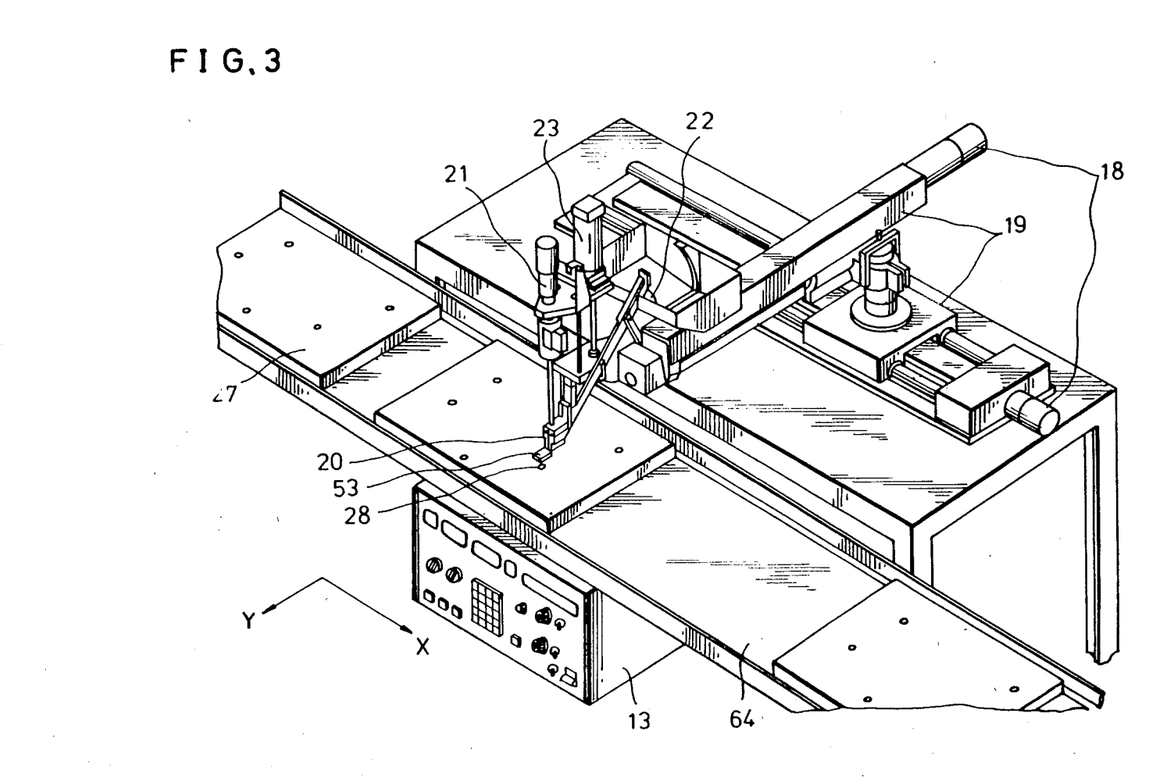
FIG. 3 is a perspective view showing an outline of the first embodiment of the numerical control screw tightening machine of the present invention.

The block diagram of the numerical control screw tightening machine of the first embodiment of the present invention is shown in FIG. 2. And the perspective view of the numerical control screw tightening machine of that is shown in FIG. 3.

A numerical control apparatus 13 in FIG. 2 comprises a central processing unit 15, a program memory means 14, a first numerical control means 16, a second numerical control means 17, a sensing starting control means 24 and a sensing stopping control means 25. A screw tightening apparatus 23 comprises a table driving means 18, a table 19 (abbreviated as X-Y table, hereinafter), a head member 20, an electrical driver 21 and a screw supplying source 22. In FIG. 3, an ultrasonic transmitting and receiving element 53 (hereinafter abbreviated as ultrasonic transducer) of the hole position detecting means 26, is disposed by being fixed on the head member 20, and can be movable in two axis directions, namely X and Y directions, in synchronism with the operation of the X-Y table 19.

Figure 4A:
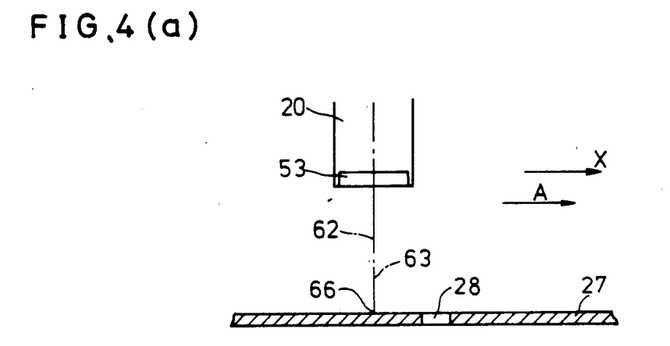
FIG. 4(a) is a schematic side view showing a main part of a head member and a work in the first embodiment of the present invention.
Figure 4B:
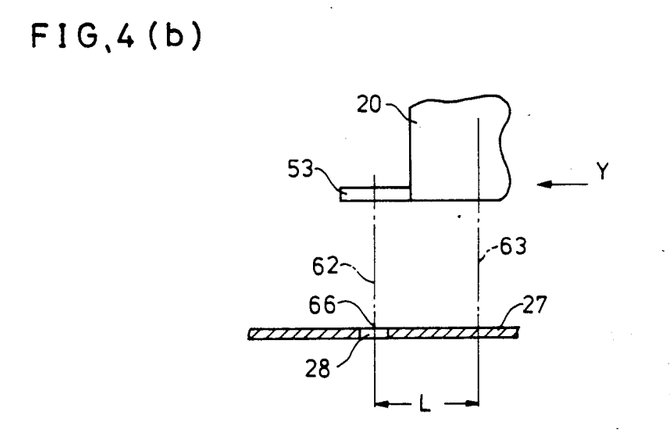
FIG. 4(b) is a schematic another side view showing the main part of the head member and the work in the first embodiment of the present invention.

The main part of the head member 20 and the work 27 having a hole 28 are schematically shown in FIGS. 4(a) and 4(b).

The arrangement of the ultrasonic transducer 53 in relation to a central position 63 of the screw tightening (a central position of the electrical driver 21) is as shown in FIGS. 4(a) and 4(b). That is, the central position 62 of the ultrasonic beam transmitted or received by the ultrasonic transducer 53 is consistent with the central position 63 of the screw tightening in the X-axis direction and is shifted by a length L in the Y-axis direction.

Figure 5:
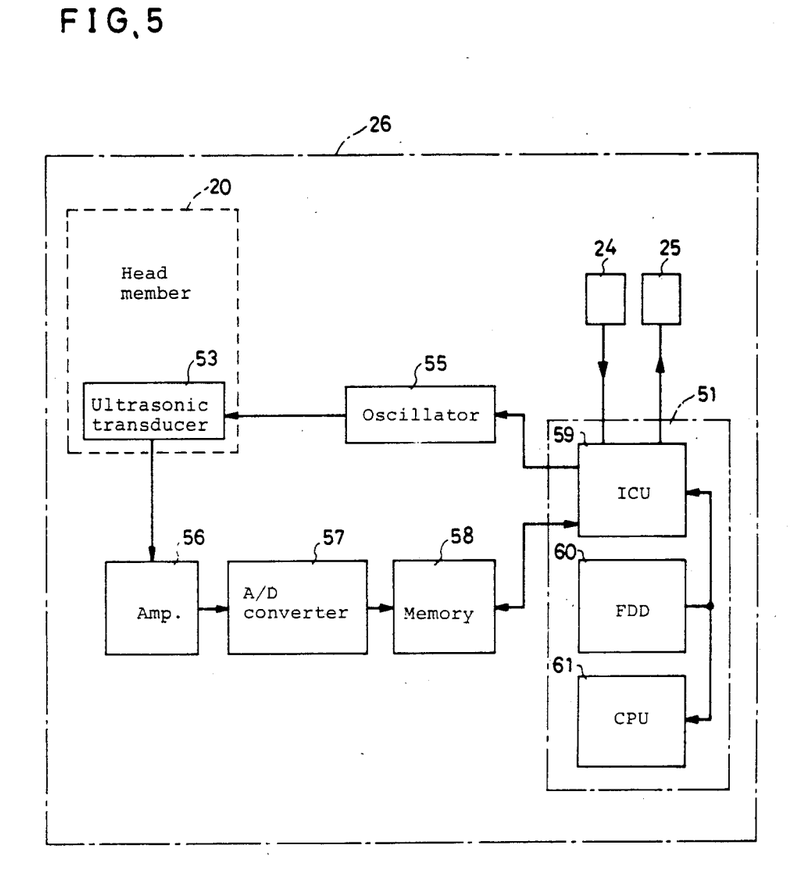
FIG. 5 is a block diagram showing a hole position detecting means of the first embodiment of the present invention.

The hole position detecting means 26 having the ultrasonic transducer 53 is described as follows. The outline of the hole position detecting means 26 is shown in FIG. 5. As shown in FIGS. 4 and 5, the ultrasonic transducer 53 transmits an ultrasonic wave of a predetermined frequency against the hole 28 of the work 27 by an oscillator 55 and receives the reflected ultrasonic wave from the work 27. The received signal of the ultrasonic transducer 53 is converted to a digital signal by an analog-digital converter 57 (hereinafter abbreviated as A/D converter) through a receiving signal amplifier 56 and memorized in the memory 58. A data processing control apparatus 51 comprises an interface control unit 59 (hereinafter abbreviated as ICU), a floppy disk driving apparatus 60 (hereinafter abbreviated as FDD) and a microcomputer 61 (hereinafter abbreviated as CPU). The ICU 59 is connected to the FDD 60 and CPU 61 and issues a control signal for driving the oscillator 55, processes the data supplied from the memory 58 for a preliminary processing, receives a control signal from the sensing starting control means 24 in the numerical control apparatus 13 and supplies a control signal and hole position information into the sensing stopping control means 25 in the numerical control apparatus 13. The CPU 61 detects and calculates the intensity of signal due to the reflected ultrasonic wave in accordance with the predetermined stored program supplied beforehand from the FDD 60.

The operation of the hole position detecting means 26 is described as follows: In the embodiment, the transmitting and receiving face of the ultrasonic transducer 53 is parallel with the surface of the work 27, and the ultrasonic transducer 53 is transferred in parallel with the work 27 in the X axis direction for detecting the X-axis direction central position of the hole 28.

Figure 6:
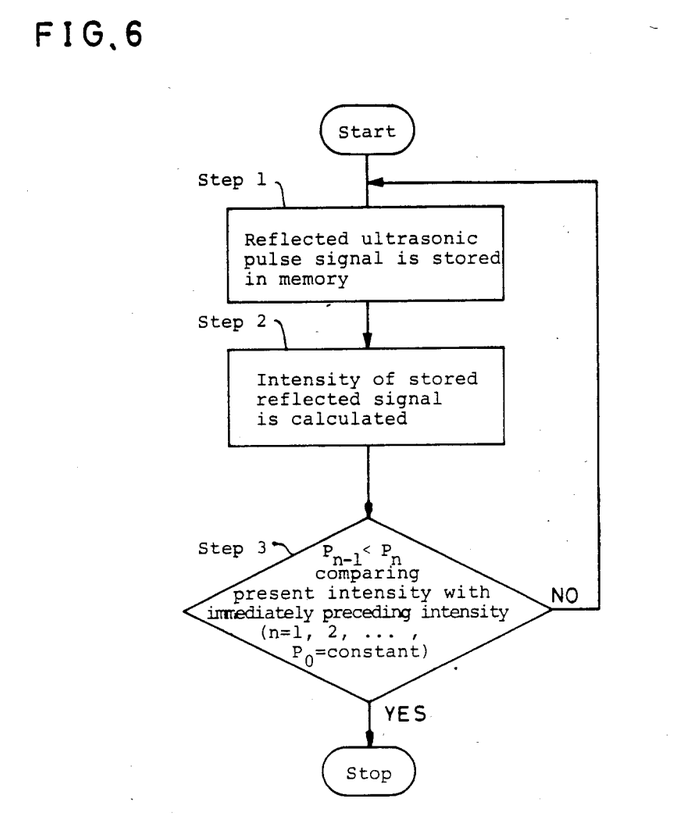
FIG. 6 is a flow chart showing an outline of an operation for detecting a hole position.

The operation of detecting the hole position is executed in accordance with the program sequence as shown in the FIG. 6, which has been preliminarily stored in the CPU 61 from the FDD 60.

Figure 7:
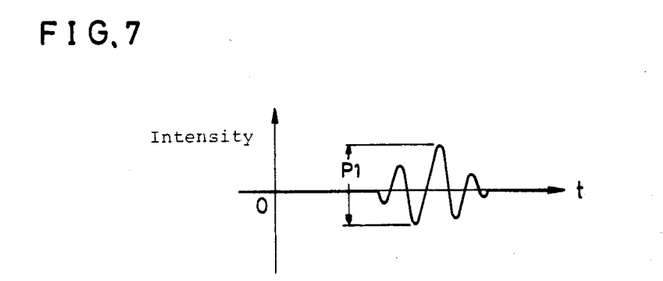
FIG. 7 is a wave chart showing a reflected signal of an ultrasonic at a hole position detecting.

In the step 1 of FIG. 6, when the ultrasonic transducer 53 reaches a position 66, as will be described later, from which the hole detecting is commenced, the sensing starting control means 24 of the numerical control apparatus 13, issues a starting signal to the ICU 59. The ICU 59 upon receipt of the starting signal drives the oscillator 55 and the ultrasonic transducer 53. The ultrasonic transducer 53 transmits an ultrasonic pulse of a predetermined frequency to the work 27 and receives the reflected ultrasonic wave. At the same time the ICU 59 makes the amplifier 56, the A/D converter 57 and the memory 58 operate. Therefore, the received ultrasonic signal is amplified by the amplifier 56 and converted to a digital signal by the A/D converter 57 and stored in the memory 58. In FIG. 4(a), the chain line 62 indicates the central position of the ultrasonic beam from the ultrasonic transducer 53. FIG. 7 shows the signal reflected from the work 27 and stored in the memory 58.

Next, in the step 2, the reflected signal stored in the memory 58 is transferred to the CPU 61 through the ICU 59. The CPU 61 calculates the intensity $P_1$ of the reflected signal according to a program sequence preliminarily stored from the FDD 60.

In the step 3, the CPU 61 finds whether the intensity $P_1$ of the reflected signal is the minimum value. That is, the minimum value is obtained by comparing the present intensity value $P_1$ and the immediately previous intensity value which is in this time $P_0$ (=large constant). When the present intensity $P_1$ is equal or smaller than the immediately previous intensity $P_0$, it is judged that the central position of the hole 28 is not detected yet. Then in this time, since the intensity $P_1$ is smaller than the intensity $P_0$ the hole position detecting means 26 waits again for another sensing start signal from said sensing starting control means 24. On the other hand, the numerical control apparatus 13 transfers the ultrasonic transducer 53 by a predetermined distance in an X-axis direction and instructs the sensing starting control means 24 to issue a sensing start signal to the hole position detecting means 26. Then the program sequence in FIG. 6 starts to operate again and the present intensity $P_n$ and the immediately preceding intensity $P_{n-1}$ are compared (n=2, 3, . . . ).

When the intensity $P_n$ obtained presently becomes larger than the immediately preceding intensity $P_{n-1}$, it is judged that the central position 62 of the ultrasonic beam passed the central positions of the hole 28. Incidentally, even when a variation of the intensity, caused by a noise produced by, for example, an interference of the ultrasonic wave, ocurrs, the correct minimum value should be detected. Then, for avoiding the variation caused by the noise, it is judged that the central position 62 of the ultrasonic beam passed the central positions of the hole 28 only when the intensity $P_n$ becomes larger than the immediately preceding intensity $P_{n-1}$ and the intensity $P_n$ is less than a predetermined intensity value, for example, 1800 mV in FIG. 6. Then, the operation of the program sequence in FIG. 6 is stopped. At this time the ICU 59 issues an information with regard to the timing of detecting the minimum value to the sensing stopping control means 25. The means 25 issues the information to the central processing unit 15. The central processing unit 15 calculates the central position in an X-axis direction of the hole 28 in accordance with the information.

Figure 8:
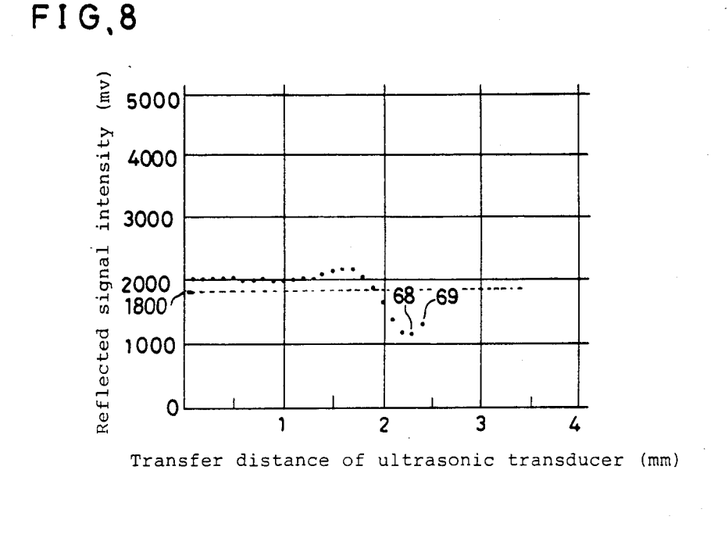
FIG. 8 is a graph showing a relation between an intensity of the reflected ultrasonic signal and an ultrasonic element transfer distance in the first embodiment of the present invention.

In the FIG. 8, the variation of the reflected signal intensity from the work 27 is shown when the ultratransducer 53 is transferred in the X-axis direction. The ordinate is graduated by the reflected signal intensity and the abscissa is graduated by the transferred distance in the X-axis direction. The point 68, at which point the reflected signal intensity indicates the minimum value, is corresponding to the central position in the X-axis direction, in the hole 28 of the work 27. Therefore the central position in the X-axis direction, of the hole 28 can be detected based on the timing of detecting the minimum value point. Incidentally, in the above-mentioned embodiment, the immediately next point 69 to the minimum value point 68 is detected, therefore the central processing unit 15 calculates the correct central position in the X-axis direction, considering that the sensing stopping control means 25 issues the information with regard to the timing of the detecting the immediately next point 69.

The central position in the Y-axis direction of the hole 28 can be obtained by the same operation as that of the central position in the X-axis direction of the hole 28, considering the above-mentioned distance L in the Y-axis direction of the ultrasonic transducer 53.

The operation of the numerical control screw tightening machine constructed as above-mentioned, is described as follows.

Figure 9:
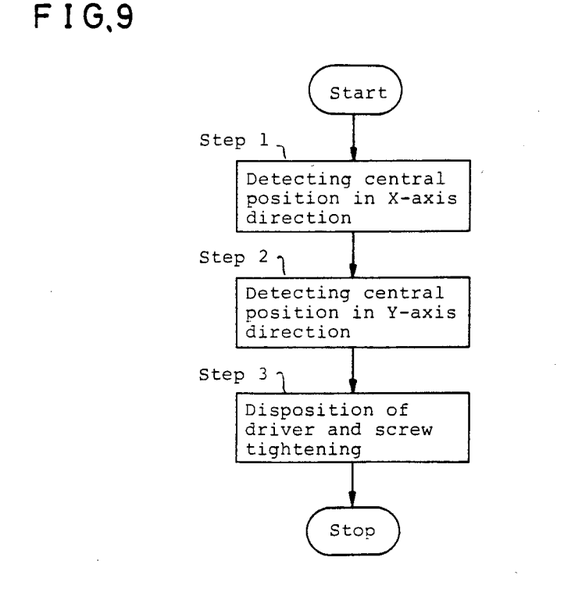
FIG. 9 is a flow chart showing an outline of an operation for tightening a screw in the first embodiment of the present invention.
Figure 10:
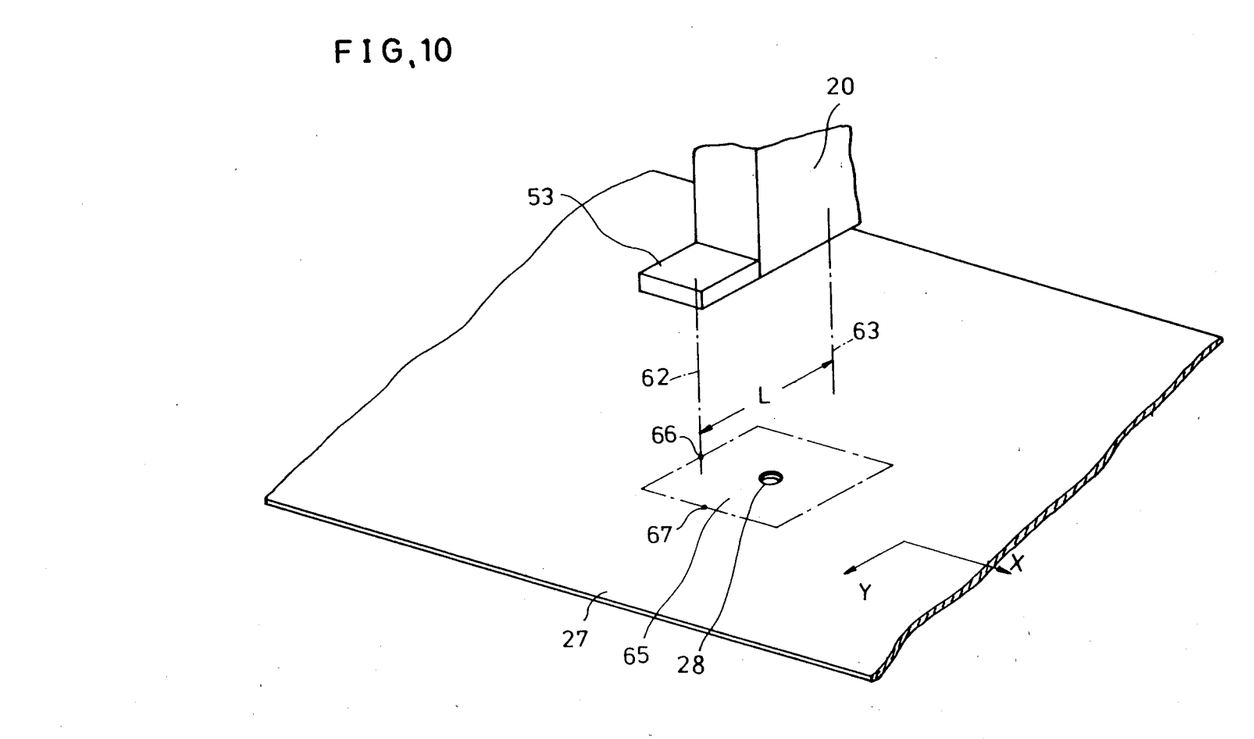
FIG. 10 is a perspective view showing the main part of the head member of the present invention.

The detecting of the hole 28 and teh screw tightening are executed in accordance with the sequence stored in the program memory means 14 as shown in FIG. 9. FIG. 10 is a perspective view corresponding to FIGS. 4(a) and 4(b). The rectangular area designated by chain lines 65 in FIG. 10 is such an area, within which area the central position of the hole 28 has a possibility to get out of order from a standard position to which the hole 28 should be transferred by the conveyer 64. The present invention can detect a correct central position of the hole 28 if the discrepancy of the hole 28 is within this area 65.

In the step 1 of the flow-chart of FIG. 9, the central position in the X-axis direction of the hole 28 is detected. The central processing unit 15 instructs the first numerical control means 16 to make the X-Y table 19 transfer to the starting position for detecting the central position in the X-axis direction of the hole 28. The first numerical control means 16 makes the X-Y table 19 transfer to the predetermined position by driving the table driving means 18. The predetermined position is such position that the beam axis 62 of the ultrasonic beam of the ultrasonic transducer 53 is disposed outside the area 65. This predetermined position is stored beforehand in the program memory means 14. The point 66 is the crossing point of the upper surface of the work 27 and the central line 62 of the ultrasonic beam. From the point 66, the detecting operation in the X-axis direction is started. The central processing unit 15 instructs at an interval of a predetermined term the first numerical control means 26 to make the X-Y table transfer by a predetermined distance in the X-axis direction and also the sensing starting control means 24 to drive the hole position detecting means 26. The sensing starting control means 24 issues a control signal to the ICU 59 of the hole position detecting means 26. Then, as abovementioned, the ultrasonic transducer 53 transmits an ultrasonic wave to the work 27 and receives the reflected ultrasonic wave. Thus, the minimum value point corresponding to the central position in the X-axis direction of the hole 28 is detected, and the ICU 59 issues the stopping signal to the sensing stopping control means 25. The sensing stopping control means 25 issues a signal to the central processing unit 15, and the central processing unit 15 calculates the correct central position in the X-axis direction of the hole 28 based on the central position information, namely, taking account of one transfer distance from a position corresponding to the minimum value, in accordance with a pre-stored program.

In the step 2, the central position in the Y-axis direction of the hole 28 is detected. That is, the central processing unit 15 disposes the X-Y table 19 at such position in X-axis direction that which is based on the position detected in the above-mentioned step 1 of the FIG. 9, and a position in Y-axis direction is preliminarily stored in the program memory means 14, so that the central position of the ultrasonic beam of the ultrasonic transducer 53 comes outside the area 65. The point 67 is an intersection point of the central line 62 of the ultrasonic beam and the surface of the work 27. Then the X-Y table 19 is transferred by a predetermined distance in a Y-axis direction from the reference point 67. Thus the central position in a Y-axis direction of the hole 28 of the work 27 is detected in the same way as that of the step 1.

In the step 3, the central processing unit 15 issues to the first numerical control means 16, a signal for transferring an axis 63 of the driver 21 to the central position of the hole 28 which is detected in the abovementioned steps 1 and 2. And after the X-Y table 19 has been transferred to the above-mentioned position, the central processing unit 15 issues to the second numerical control means 17, a signal for driving the electrical driver 21. That is, the first numerical control means 16 controls the table driving means 18 to dispose the X-Y table 19 at the above-mentioned position, and after this operation it makes the head member 20 transfer downwards and the electrical driver 21 come near the work 27. The second numerical control means 17 drives the electrical driver 21 to tighten a screw to a predetermined torque, and upon reaching the predetermined torque issues a signal of completion of tightening to the central processing unit 15, to stop the electrical driver 21. Then, the central processing unit 15 issues a signal concerning the tightening completion to the first numerical control means 16. The means 16 transfers the head member 20 upwards for making the electrical driver 21 keep away from the work 27.

As above-mentioned, the screw tightening of the work 27 is completed by the repetition of the detection of the holes 28, 28, . . . on the work 27 and the screw tightenings.

As another embodiment, the sensing starting control means 24 may be constituted such that it issues the starting signal only at the beginning and thereafter the hole position detecting means 26 itself executes the step sequence of FIG. 6 with an interval of a predetermined term until to detect the minimum value point. And upon detection of the central position, the means 26 calculates the central position of the hole 28 based on (i) the term between the starting time and the detecting time, and (ii) the preliminarily stored detecting start position. The means 26 issues the information of the central position of the hole 28 and the stopping signal to the sensing stopping control means 25.

As above-mentioned, in the embodiment, the correct screw tightening can be realized by disposing the central position 62 of the ultrasonic beam from the ultrasonic transducer 53 disposed near the head member 20, outside the area, and by transferring the head member 20 and by driving the hole position detecting means 26 according to the signal of the sensing starting control means 24 and by detecting the central position of the hole 28, the central position information being supplied to the sensing stopping control means 25, and by the transferring the X-Y table 19 to the detected central position. Thus, even when positional relation between the hole position of the work 27 supplied by the roller conveyer 64 and the screw driver 21 is largely discrepant, all screw tightenings can be realized precisely.

A second embodiment of the present invention is described as follows referring to FIG. 11 and thereafter.

Figure 11:
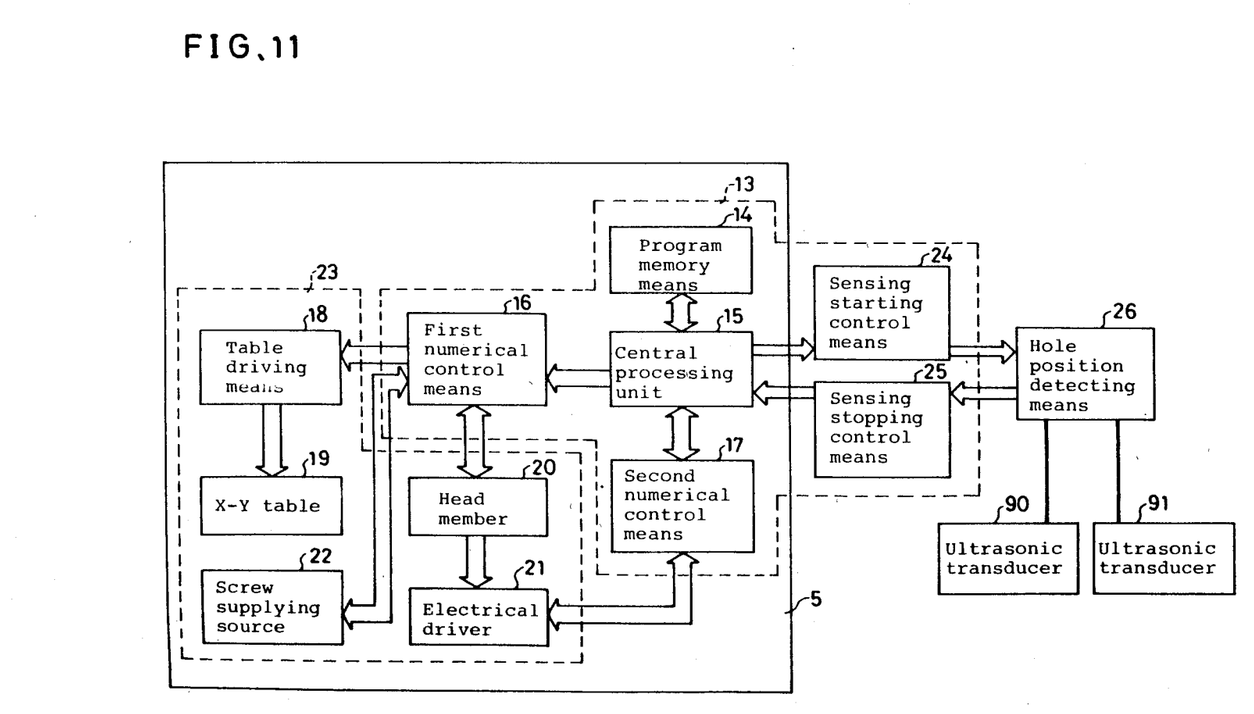
FIG. 11 is a block diagram showing a second embodiment of the numerical control screw tightening machine of the present invention.
Figure 12:
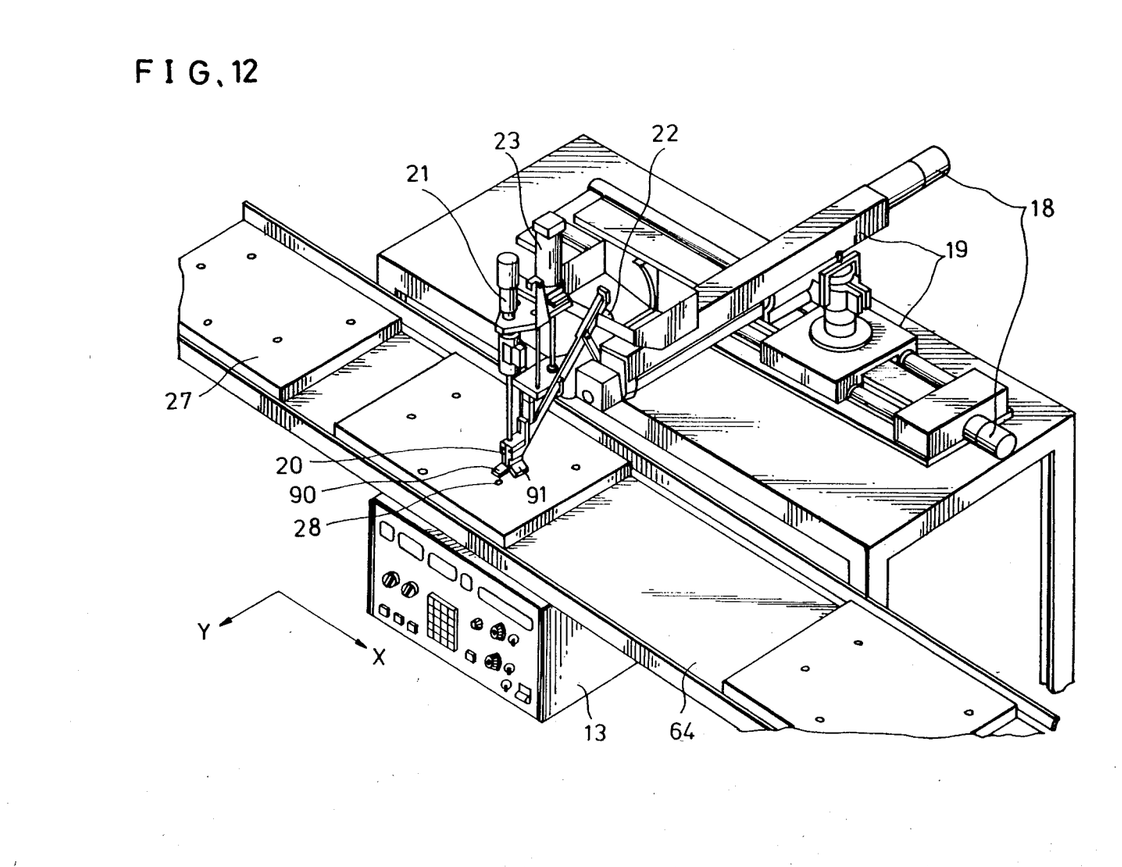
FIG. 12 is a perspective view showing an outline of the first embodiment of the numerical control screw tightening machine.
Figure 13A:
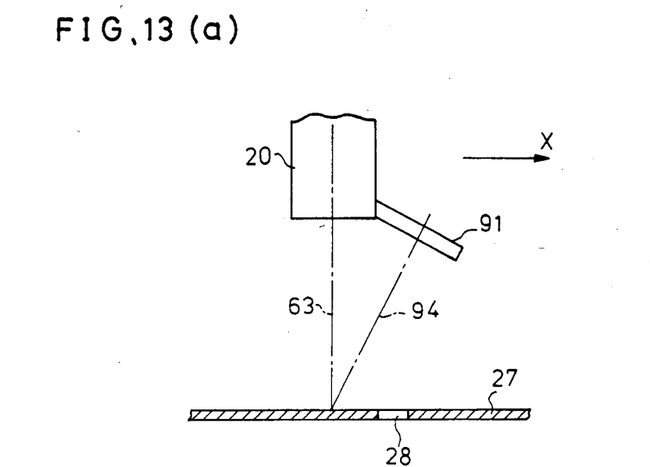
FIG. 13(a) is a schematic side view showing a main part of a head member and a work in the second embodiment of the present invention.
Figure 13B:
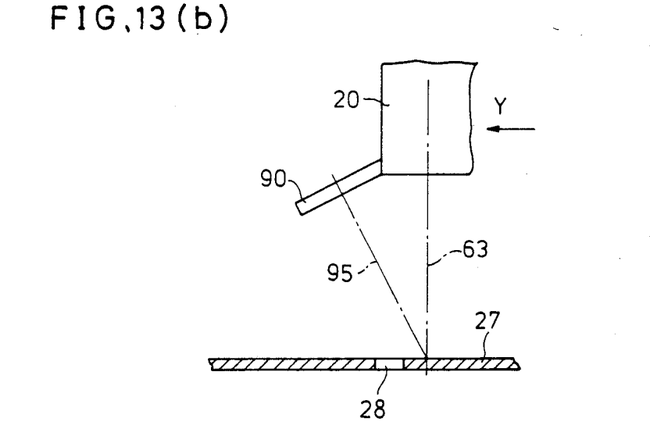
FIG. 13(b) is a schematic another side view showing the main part of the head member and the work in the second embodiment of the present invention.
Figure 14:
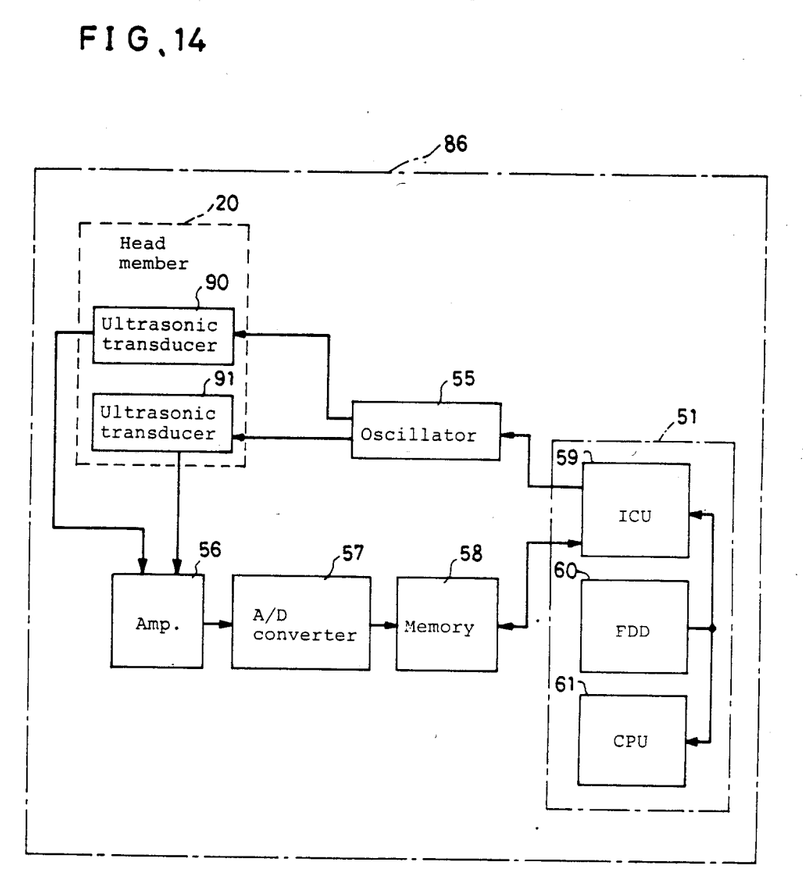
FIG. 14 is a block diagram showing a hole position detecting means of the second embodiment of the present invention.

FIG. 11 is a block diagram of the numerical control screw tightening machine of the second embodiment. The parts 5, 13, 14, 15, 17, 18, 19, 20, 21, 22, 23, 24, 25 and 26 in FIG. 11 are the same as the parts 5, 13, 14, 15, 17, 18, 19, 20, 21, 22, 23, 24, 25 and 26 in FIG. 2, respectively. FIG. 12 is a perspective view of the numerical control screw tightening machine of the second embodiment. The parts 13, 18, 19, 20, 21, 22, 23, 27, 28 and 64 in FIG. 12 are the same as the parts 13, 18, 19, 20, 21, 22, 23, 27, 28 and 64 in FIG. 3, respectively. In the second embodiment, ultrasonic transducers 90, 91 are disposed near the head member 20, one 90 being in the Y-axis direction and the other 91 being in the X-axis direction. The transducer 90 is for detecting the central position in X-axis direction of the hole 28, and the transducer 91 is for detecting the central position in the Y-axis direction of the hole 28. FIG. 13a) and FIG. 13(b) show the positioning of the transducers 90 and 91 with respect to the screw tightening position (the central position of the electrical driver 21). The central lines 94 and 95 of the transducers 90, 91, and the central line 63 of the screw tightening position (central axis of the electrical driver 21) cross the surface of the work 27, and the active face of the transducers 90, 91 the active face being inclined against the surface of the work 27. FIG. 14 is a block diagram of the hole position detecting means 86. The parts 20, 51, 55, 56, 57, 58, 59, 60 and 61 in FIG. 14 are the same as the parts 20, 51, 55, 56, 57, 58, 59, 60 and 61 in FIG. 5, respectively. The oscillator 55 can issues a signal selectively to the transducers 90, 91.

Figure 15:
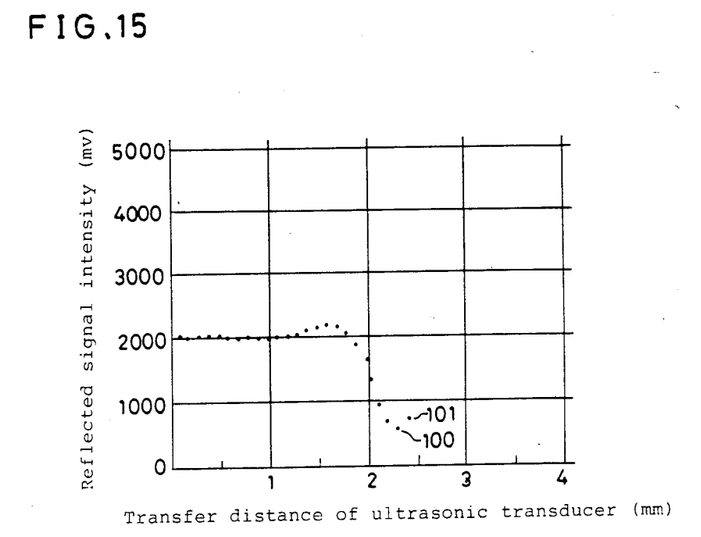
FIG. 15 is a graph showing a relation between an intensity of the reflected ultrasonic signal and an ultrasonic element transfer distance in the second embodiment of the present invention.

FIG. 15 is a graph showing intensity of signal reflected from the work 27 when the ultrasonic transducer 91 is transferred in the X-axis direction. The ordinate is graduated with the reflected signal intensity P and the abscissa is graduated with the transfer distance of the ultrasonic transducer 91. The minimum value point 100 corresponds to the central position in the X-axis direction of the hole 28 of the work 27. Thus the central position in the X-axis direction of the hole 28 can be obtained from the variation of the reflected signal intensity in substantially the same way as that of the first embodiment.

The operation for detecting the hole position and subsequent screw tightening in the screw tightening machine of the second embodiment can be executed substantially in the same way as that of the first embodiment.

In the second embodiment, since the central line 63 of the screw tightening and the central axises 94, 95 of the ultrasonic beam crosses the surface of the work 27 as above-mentioned, after completion of detection of central position, the screw tightening can be realized without largely transferring the X-Y table. Therefore, the time for screw tightening can be shortened. Furthermore, the screw tightening machine of the second embodiment can obtain higher sensitivity of the detecting hole position than the first embodiment of the screw tightening machine in which the face of the transducer is disposed in parallel with the surface of the work 27.

As above-mentioned, the present invention can detect the central position of the hole of the work by the hole position detecting means and tighten the screw correctly and automatically. Therefore, the numerical control screw tightening machine is adequate for the automatic production system and has very large practical use.

What is claimed is:

1. A numerical control screw tightening machine comprising:
    a screw tightening apparatus having a movable table and an electrical driver fixed to said table,
    hole position detecting means comprising an ultrasonic element fixed to said screw tightening apparatus for transmitting and receiving ultrasonic beam thereby cooperatively obtaining an information with regard to a position of hole of a work, the hole of said work being disposed preliminarily roughly by a transfer means, and
    a numerical control apparatus supplied with said information with regard to said hole position from said hole position detecting means, for controlling said table, said electrical driver and said hole position detecting means.

2. A numerical control screw tightening machine in accordance with claim 1, wherein
    said hole position detecting means is for transmitting an ultrasonic wave against said work and receiving a reflected ultrasonic wave from said work and obtaining a minimum value point of a variation of an intensity of said reflected ultrasonic, said variation caused by transferring of said ultrasonic element by said numerical control apparatus, and issuing said information based on said minimum value point.

3. A numerical control screw tightening machine in accordance with claim 2, wherein
said information is concerning with a timing of detecting said minimum value point.

4. A numerical control screw tightening machine in accordance with claim 2, wherein
said information is concerning with said central position of said hole.

5. A numerical control screw tightening machine in accordance with claim 2, wherein
said ultrasonic element can transfer in one direction and transfer in another direction which is perpendicular to said one direction.

6. A numerical control screw tightening machine in accordance with claim 2, wherein
said minimum value can be obtained in a manner that a present intensity of the reflected ultrasonic is compared with a just before intensity of the ultrasonic and the minimum value point is such an intensity that for the first time the present intensity becomes more than the immediately preceding intensity.

7. A numerical control screw tightening machine in accordance with claim 6, wherein
a central position in one direction of said hole is detected by transferring said ultrasonic element in said one direction and
an central position in another direction of said hole, the direction of which is perpendicular to said one direction, is detected by transferring said ultrasonic element in said another direction.

8. A numerical control screw tightening machine in accordance with claim 2, wherein
a central axis of said electrical driver and a central axis of an ultrasonic beam of said ultrasonic element intersect on the surface of said work.

* * * * *